June 29, 1948. R. J. SHANK 2,444,407
ELECTRO-OPTICAL INDICATING APPARATUS
Filed Nov. 10, 1944
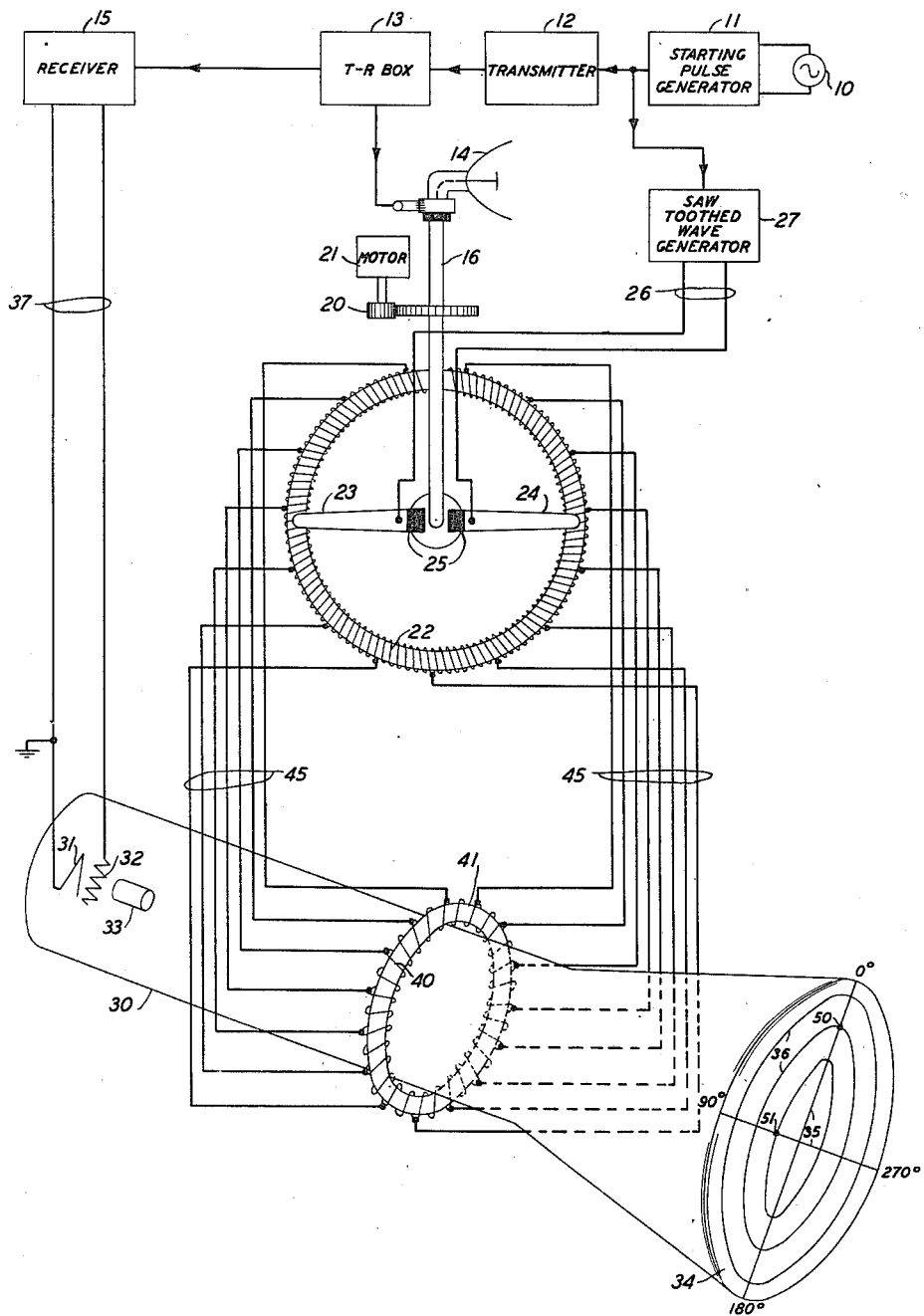
INVENTOR
R.J. SHANK
BY
*G. F. Huerman*
ATTORNEY Patented June 29, 1948

2,444,407

UNITED STATES PATENT OFFICE 2,444,407

ELECTROOPTICAL INDICATING APPARATUS

Robert J. Shank, New York, N. Y., assignor to Bell Telephone Laboratories, Incorporated, New York, N. Y., a corporation of New York Application November 10, 1944, Serial No. 562,748

2 Claims. (Cl. 315—27)

This invention relates to electro-optical indicating apparatus and particularly to apparatus for indicating the position of a distant object.

An object of the invention is to provide novel apparatus for deflecting a cathode-ray beam under control of a rotating magnetic field of periodically varying intensity.

Another object is to provide novel apparatus for deflecting a cathode-ray beam under control of a rotating magnetic field having saw-toothed wave intensity variations.

A further object is to provide novel apparatus for indicating the position of a distant object.

In accordance with a specific embodiment of the invention, herein shown and described for the purpose of illustration, there is provided apparatus for generating under control of starting pulses and transmitting from a directional antenna recurring pulses of radiant energy and for picking up echo pulses reflected from distant objects. The echo pulses are detected in a radio receiver and impressed upon the control grid-cathode circuit of a cathode-ray tube to increase the intensity of the cathode-ray beam and thus increase the brightness of a spot on the luminescent screen upon which the cathode-ray beam impinges at the time that an echo pulse is received. The antenna is mounted on a vertical shaft which is driven by a motor at a speed of about 20 revolutions per minute, for example, so that the direction with respect to azimuth in which the pulses are radiated is changed continuously. There is provided a potentiometer having a continuous resistance winding wound upon an annular form and having a brush arm carrying brushes which at any instant are in contact with diametrically opposed points of the potentiometer resistance, the brush arm being coupled to the antenna shaft so that it is rotated in synchronism with the rotation of the antenna. The starting pulses which control the generation of the pulses of radio waves are also supplied to a generator of saw-toothed wave energy having direct and alternating components, the output terminals of this saw-toothed wave generator being electrically connected to the brushes of the potentiometer. There is provided around a portion of the cathode-ray tube through which the cathode-ray beam is projected toward the luminescent screen of the tube a stationary deflecting coil comprising a continuous winding wound upon a toroidal core of magnetic material. A plurality of equally spaced points on the winding of the deflecting coil, preferably an odd number of points, are respectively, conductively connected to a plurality of equally spaced points on the resistance winding of the potentiometer.

There is thus set up by the deflecting coil a rotating magnetic deflecting field having sawtoothed wave intensity variations for causing the deflection of the cathode-ray beam. The beam therefore describes upon the screen of the cathode-ray tube successive radial paths, one for each radiated pulse, the direction of the paths corresponding to the direction of radiation of successive pulses, respectively, from the antenna. An echo pulse received from an object when the antenna is pointing in a certain direction causes the intensity of the cathode-ray beam to be increased and a spot of increased brightness to be produced on a radius corresponding to the direction in which the antenna is pointing. The distance of the bright spot from the origin of the radial path corresponds to the distance from the antenna of the object from which the echo pulse is received. If the position of objects at a maximum distance of 50,000 yards is to be indicated, for example, since the time required for a radiated pulse to travel to an object at this distance and for its echo to return is about 300 microseconds, successive radiated pulses should be separated by an interval somewhat larger than 300 microseconds. The bright spots produced upon the luminescent screen of the cathode-ray tube will then indicate the azimuth and range of objects within a radius of 50,000 yards.

The single figure of the drawing is a diagrammatic view of a position indicating apparatus in accordance with the invention.

Referring to the drawing, there are provided an oscillator 10 for generating a sinusoidal wave which is impressed upon a starting pulse generator 11 which in turn generates a series of pulses of brief duration, one for each cycle of the sinusoidal wave. The starting pulses are impressed upon a radio transmitter 12 which produces a series of brief pulses of radio frequency energy corresponding to and in synchronism with the starting pulses. Suitable apparatus for producing a series of pulses which are transmitted from an antenna is disclosed in an application of L. A. Meacham, Serial No. 491,791 filed June 22, 1943 (Patent No. 2,422,204, granted June 14, 1947). These radio pulses are impressed through a suitable coupling arrangement or T-R box 13 upon a dipole directional antenna 14 from which the pulses are radiated toward a target. A suitable coupling arrangement is disclosed in an application of D. E. Wooldridge, Serial No. 499,188, filed August 19, 1943 (Patent No. 2,426,658, granted September 2, 1947). Echo pulses reflected from objects are picked up by the antenna 14 and impressed through the T-R box upon radio receiving apparatus 15 where the echo pulses are detected and amplified. The coupling apparatus 13 serves to shunt the input of the receiver 15 during pulse transmission periods so that the same antenna may be used both for transmission and reception of pulses. The T-R box is a transmit-receive switch which may be of any desired type and may conveniently be a Western Electric Company 709A space discharge tube. This tube is essentially a resonant cavity filled with an ionizable gas. During reception, with the low voltages of the received energy, the gas is not ionized, the cavity is tuned to resonance and the received energy is conducted to the radio receiver 15. During the transmission of a pulse, the voltages due to the pulse ionize the gas, thus detuning the cavity and preventing the energy of the pulse from reaching the radio receiver 15.

The antenna 14 is attached to a vertical shaft 16 which is coupled through gearing 20 to a motor 21 for driving the shaft at a speed of 20 revolutions per minute, for example. The direction in which successive pulses of radio frequency energy are propagated is therefore continuously changing. There is provided a potentiometer comprising a continuous resistance winding 22 wound upon an annular form and brush members 23 and 24 secured to the shaft 16 and insulated therefrom by the insulating members 25. The brushes which simultaneously contact diametrically opposed portions of the potentiometer are thus driven in synchronism with the antenna 14. The brushes, respectively, are connected by a pair of leads 26 to the output terminals of a saw-toothed wave generator 27. The generator 27 produces a unidirectional saw-toothed current wave which is maintained in synchronism with the pulses radiated from antenna 14 under control of pulses from the starting pulse generator 11 supplied to the generator 27. Each sweep of the saw-toothed wave is thus started coincidentally with a radio frequency pulse transmitted from the antenna 14.

There is provided a cathode-ray tube 30 having an electron gun of the well-known type comprising a cathode 31, a control electrode 32, and an anode 33, and a screen 34 of luminescent material upon which a cathode-ray beam from the electron gun is projected. If desired there may be engraved upon the screen as an aid in determining the position of objects radial lines 35 extending from the center or origin and concentric lines 36 about the center. Leads 37 connect the output of radio receiver 15 to the cathode and control grid of the cathode-ray tube to impress the echo pulses across the control grid-cathode path of the tube. The cathode-ray tube is thus modulated by the echo pulses to increase the brightness of the spot on screen 34 on which the beam is projected at the time that an echo pulse is received.

For producing an electromagnetic deflecting field for controlling the deflection of the cathode-ray beam there is positioned around the neck portion of the cathode-ray tube a coil comprising a continuous winding 40 wound on a toroidal core 41 of magnetic material which is coaxial with the major axis of the cathode-ray tube. Current is supplied to the winding 40 through leads 45 which connect equally spaced points on coil winding 40 with corresponding equally spaced points on potentiometer resistance winding 22. While a relatively large odd number of leads 45 are preferably used to interconnect the coil winding 40 with the potentiometer winding 22, in some cases it may be desirable to use a smaller number or an even number of leads 45 for this purpose.

It will be seen that for any fixed position of the shaft 16 current will be supplied from the saw-toothed wave generator 27 through leads 26, brushes 23, 24 and leads 45 to the winding 40 to cause to be set up by coil 40, 41 a magnetic field which deflects the cathode-ray beam in a certain direction from its undeflected position or origin. The intensity of the deflecting field and, therefore, the amount of the deflection will vary with the amplitude changes of the current supplied from generator 27 to the winding 40. Since this current has a saw-toothed wave form, that is, the current increases at a substantially constant rate and then drops abruptly to its original amplitude which may be zero, the beam will be deflected to cause it to repeatedly trace a radial line extending from the origin on the screen 34. For a different position of shaft 16 a radial line extending in a different direction corresponding to the angular position of the shaft 16 will be traced on the screen 34. Therefore, as the angular position of shaft 16 is changing continuously during operation, successive, substantially contiguous radial lines will be traced on the screen 34 by the cathode-ray beam. In the absence of a received echo pulse, the intensity of the cathode ray beam is such that the successive radial traces produced upon the screen 34 are invisible, or nearly so. However, when an echo pulse is received the intensity of the cathode-ray beam is greatly increased so that a bright spot is produced upon the screen 34 at that instant.

The apparatus may be mounted upon an airplane, for example, so that zero degrees on the scale engraved upon the screen 34 will designate the direction of flight, the 180 degree marking will designate the opposite direction, the 270 degree marking will designate 90 degrees to the right, and the 90 degree marking will designate 90 degrees to the left. A bright spot 50 on the screen will then indicate an object in the direction of flight distant one-half the maximum scale distance, say 25,000 yards. A bright spot 51 will similarly indicate an object 90 degrees to the left and 12,500 yards distant. The range and azimuth with respect to the direction of flight of other objects from which echo pulses are received would be similarly indicated upon the cathode-ray tube screen.

What is claimed is:

1. In combination a cathode-ray device having means for producing a cathode-ray beam, a stationary coil substantially coaxial with said beam when the beam is undeflected comprising a continuous winding on a toroidal core, a potentiometer comprising a continuous winding on an annular form, a pair of brushes making contact with diametrically opposed points simultaneously on said potentiometer winding and a rotatable shaft coupled to said brushes for driving them simultaneously along said winding while in engagement therewith, a plurality of conductors for connecting equally spaced points of said potentiometer winding with equally spaced points of said coil winding respectively, a source of direct current having saw-toothed amplitude variations connected to said brushes, thereby causing current to flow through said coil winding to set up a magnetic field for deflecting the cathode-ray beam in a direction dependent upon the angular position of said shaft and by an amount dependent upon the instantaneous amplitude of the current from said source, and means for rotating said shaft about its axis for causing the direction of said magnetic field to change correspondingly.

2. Indicating apparatus comprising a cathode-ray device having means for producing a cathode-ray beam and a luminescent screen upon which the cathode-ray beam impinges, a stationary coil surrounding a region through which said beam is projected toward said screen, said coil comprising a toroidal core of magnetic material and a continuous winding thereon, means for generating and supplying to said winding a direct current of saw-toothed wave form, thereby causing to be set up by said coil a magnetic field having saw-toothed wave intensity variations for deflecting said cathode-ray beam, a shaft, means for rotating said shaft about its axis, means responsive to the rotation of said shaft for controlling the supply of current from said generator to said coil winding to cause said deflecting field to rotate in synchronism with the rotation of said shaft, and means for modulating said cathode-ray beam to repeatedly increase its intensity, thereby producing a spot of increased brightness on said cathode-ray tube screen the position of which may vary.

ROBERT J. SHANK.

REFERENCES CITED

The following references are of record in the file of this patent:

UNITED STATES PATENTS

| Number | Name | Date |
|---|---|---|
| 2,395,966 | Goldberg | Mar. 5, 1946 |
| 2,404,030 | Browne | July 16, 1946 |
| 2,411,030 | De Ryder | Nov. 12, 1946 |
| 2,420,156 | Van Suchtelen | May 6, 1947 |

FOREIGN PATENTS

| Number | Country | Date |
|---|---|---|
| 520,778 | Great Britain | May 3, 1940 |